United States Patent
Bursztejn et al.

(10) Patent No.: US 6,459,688 B1
(45) Date of Patent: Oct. 1, 2002

(54) METHOD FOR RECORDING AT LEAST ONE BIMODAL MOBILE STATION IN AN ASSOCIATED DOMESTIC BASE STATION

(75) Inventors: Jacques Bursztejn, Neuilly s/Seine; Maure Havet; Vinod Kumar, both of Paris, all of (FR)

(73) Assignee: Alcatel, Paris (FR)

(*) Notice: Subject to any disclaimer, the term of this patent is extended or adjusted under 35 U.S.C. 154(b) by 0 days.

(21) Appl. No.: 09/194,012

(22) PCT Filed: Mar. 20, 1998

(86) PCT No.: PCT/FR98/00559

§ 371 (c)(1),
(2), (4) Date: Feb. 18, 1999

(87) PCT Pub. No.: WO98/43457

PCT Pub. Date: Oct. 1, 1998

(30) Foreign Application Priority Data

Mar. 20, 1997 (FR) ............................................ 97 03414

(51) Int. Cl.[7] ................................................ H04Q 7/38
(52) U.S. Cl. ........................ 370/329; 375/132; 455/426; 455/462; 455/552
(58) Field of Search .................................. 370/329, 328, 370/330, 336, 345, 347, 436, 442, 458; 375/130, 132, 135, 136; 455/426, 435, 461, 462, 463, 465, 552

(56) References Cited

U.S. PATENT DOCUMENTS

| | | | | |
|---|---|---|---|---|
| 5,406,615 A | * | 4/1995 | Miller, II et al. | 455/450 |
| 5,442,680 A | * | 8/1995 | Schellinger et al. | 455/450 |
| 5,463,659 A | * | 10/1995 | Nealon et al. | 375/202 |
| 5,715,521 A | * | 2/1998 | Fukasawa et al. | 370/350 |
| 6,122,515 A | * | 9/2000 | Ito et al. | 455/450 |

FOREIGN PATENT DOCUMENTS

| | | |
|---|---|---|
| EP | 0 656 735 A2 | 6/1995 |
| EP | 0 700 227 A2 | 3/1996 |
| FR | 2 687 874 A1 | 8/1993 |
| WO | WO 92/04796 * | 3/1992 |

OTHER PUBLICATIONS

Hyden et al., SWAN: An Indoor Wireless ATM network, IEEE, pp. 1–5, 1995.*

* cited by examiner

Primary Examiner—Wellington Chen
Assistant Examiner—Frank Duong
(74) Attorney, Agent, or Firm—Sughrue Mion, PLLC

(57) ABSTRACT

The invention relates to a registration method used for registering at least one dual mode mobile station (MMS) with an associated private base station (DBS). The private base station is connected to the public telephone network (PSTN, ISDN) and uses, for transmission and reception, frequencies which are close to or identical to those used in a cellular radio system. The dual mode mobile station can operate either in "cordless" mode, used to communicate via said private base station, or in "cellular" mode, used to communicate via base stations (BTS) within the cellular radio system. Registration of the dual mode mobile station with the private base station constitutes a preliminary stage enabling the operation of the dual mode mobile station in "cordless" mode, whereby, following each incoming or outgoing call, a conversation can be established between the dual mode mobile station and other telephone equipment, via the private base station.

According to the invention, the registration method consists in interchanging signals in accordance with a preset protocol based on a preset frequency hopping law, determining the frequency over which each signal is to be transmitted, and on a preset uplink start-up frequency, over which the dual mode mobile station transmits the first signal. The frequency hopping law and the uplink start-up frequency being specific to, and known by, the dual mode mobile station and associated private base station.

10 Claims, 2 Drawing Sheets

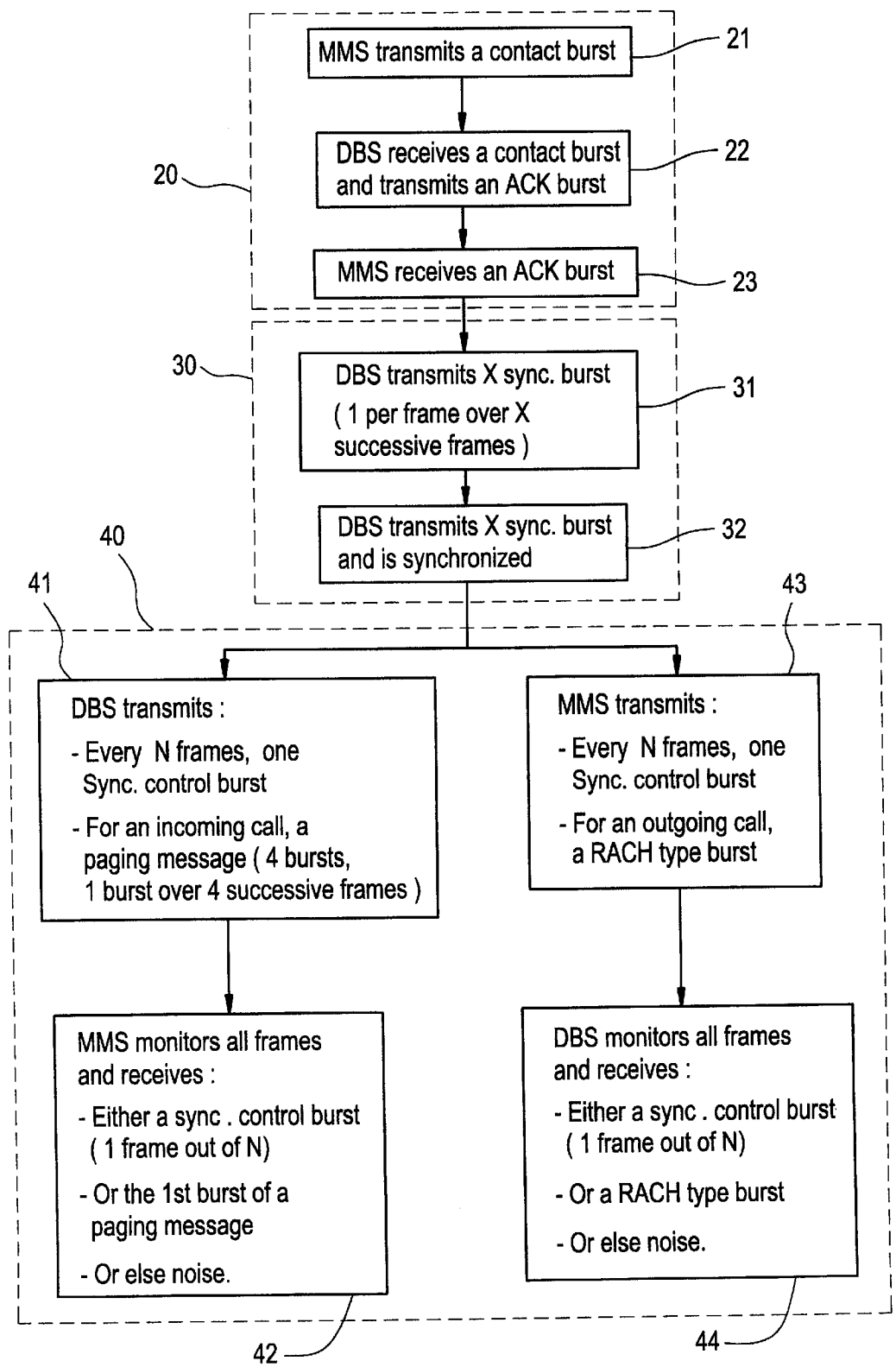

METHOD FOR RECORDING AT LEAST ONE BIMODAL MOBILE STATION IN AN ASSOCIATED DOMESTIC BASE STATION

BACKGROUND OF THE INVENTION

The invention falls within the field of radio systems.

More precisely, the invention relates to a registration method used for registering at least one dual mode mobile station (i.e. having two operating modes: "cordless" and "cellular") with an associated private base station, the base station together with the dual mode mobile station making up a cordless radio system.

First of all, it should be pointed out that there are two main families of radio system: cordless systems and cellular systems.

Conventionally, a cordless system (of the CT2 or DECT type for instance) comprises a private base station with which there are associated one or more mobile stations. There are many known applications of such a cordless system.

Thus, in a first application, the private base station is located in a dwelling, and the user and family have one or more mobile stations operating with the private base station. In this case, the private base station is also called a home or personal base station, and the mobile stations are also called portable handsets or terminals.

In a second application, the private base station is located within the premises of a company with a plurality of employees, each of them having a mobile station operating with the private base station. In this case, the private base station is also called a company or office base station.

The private base station is connected to the public telephone network. Thus, each mobile station communicates with the public network via the private base station with which it is associated. The private base station provides for local coverage only, roughly corresponding to an area the size of an apartment, a house and garden, or business premises.

Conversely, cellular systems (of the GSM 900 or DCS 1800 types for instance) are designed to provide much wider coverage, for instance the size of a country or even of a continent. Generally speaking, a cellular radio system is implemented within a geographical network of cells. A base station (hereinafter sometimes called a cellular base station) is associated with each cell. Each user has a mobile station (also called a portable terminal) capable of communicating via the base station associated with the cell within which the user is located.

Cordless and cellular systems have been developed in parallel for some considerable length of time, hence the existence of two base station designs, i.e. those usable only in a cellular system and those usable only in a cordless system.

Recently, attempts have been made to integrate both "cordless" and "cellular" types of operation in the same mobile station—called a dual mode mobile station. Indeed, because of the complexity of the cellular system, its use costs more to the user than the use of a cordless system. In other words, subscriptions and communications are charged at a higher rate in a cellular system than in a cordless system (the rates applied in the case of a cordless system being those of the public network to which the private base station is connected). Therefore, attempts are being made to make it possible for the user to use a mobile station in "cordless" mode as often as possible (i.e. as soon as the user is within local coverage of the private base station), with "cellular" mode being used only when operation in "cordless" mode is not possible.

The first known solution, which is the easiest to implement, consists in juxtaposing in the same casing the components of both a "cordless" mobile station and those of a "cellular" mobile station.

As can be easily understood, that first solution is very expensive since the price of a dual mode mobile station implemented in that way corresponds roughly to the sum of the prices of a "cordless" mobile station plus a "cellular" mobile station.

A second known solution, which is more advantageous, has recently been proposed. It consists in designing a private base station compatible, in terms of frequency band, with the cellular system used in "cellular" mode. In other words, the private base station transmits and receives over frequencies contained within the same band as the frequencies transmitted and received by base stations of the cellular system. The operation of the private base station and of the dual mode mobile station in this case is as briefly described below.

In standby mode (i.e. so long as the dual mode mobile station has not registered or after the dual mode mobile station has registered), the private base station transmits over a beacon channel to reveal its presence to the dual mode mobile station.

As for the dual mode mobile station, when in standby in "cellular" mode, it periodically listens to the beacon channel of its associated private base station. When the dual mode mobile station enters the local coverage of its private base station, it recognizes the beacon channel and then registers with the private base station. Following this registration, the dual mode mobile station operates in "cordless" mode and can be used to directly send calls to (or receive calls from) the public network, independently of the cellular network.

It is important to note that the registration of the dual mode mobile station with the private base station constitutes a stage, executed once and for all, prior to operating in "cordless" mode. In contrast, actual "cordless" mode operation consists of carrying out successively, a plurality of call set up stages (incoming or outgoing), each set up stage being followed (except in case of problems) by a conversation stage. In other words, from the moment the dual mode mobile station is registered, a plurality of successive calls can be set up and a plurality of conversations can be processed, without requiring a new registration each time.

In active mode, after the dual mode mobile station has registered with the private base station, the private base station continues to transmit over the beacon channel, in order to warn the dual mode mobile station that a call is intended for it (incoming call) or that an access request previously sent by the dual mode mobile station (outgoing call) has been accepted.

It is obvious that with that known solution, the cost of the dual mode mobile station is much less than that of the first solution, since the same hardware is used in both "cordless" and "cellular" modes.

In counterpart, with that second known solution, because of the simultaneous use of the same frequency band, there exists a risk of interference, both between various private base stations, and between private base stations and cellular base stations.

In order to minimize this risk, it has been proposed that the beacon channel be reduced to an intermittently transmitted signal, with a low operating cycle (i.e. with time slots that are relatively far apart).

Unfortunately, this proposition is not good in terms of interference. Indeed, even though the beacon channel is transmitted with a low operating cycle, it nevertheless constitutes a source of interference with all other base stations (home or cellular) using the same beacon channel. It is therefore necessary to ensure coordination in terms of frequencies and geographical coverage, but this entails very complex purchasing and installation procedures.

SUMMARY OF THE INVENTION

A particular object of the invention is to mitigate the various drawbacks of this state of the art.

More precisely, one of the objects of the present invention is to provide a registration method used for registering a dual mode mobile station with a private base station, which would enable the risks of interference to be minimized both between various private base stations and also between private base stations and cellular base stations.

The invention also aims at providing such a method, the implementation of which requires few modifications to a dual mode mobile station compared with corresponding cellular stations already in existence.

These various objects, as well as others which appear below, are achieved according to the invention by a registration method used for registering at least one dual mode mobile station with an associated private base station, said private base station being connected to the public telephone network and using, for transmission and reception, frequencies which are close to or identical to those used in a cellular radio system, said dual mode mobile station being able to operate either in "cordless" mode, or in "cellular" mode, said method consisting in interchanging signals in accordance with a preset protocol based firstly on a preset frequency hopping law, determining the frequency over which each signal is to be transmitted, and secondly on a preset uplink start-up frequency, over which the dual mode mobile station transmits the first signal, said frequency hopping law and said uplink start-up frequency being specific to, and known by, the dual mode mobile station and associated private base station.

said method being characterized in that it comprises an initial contact stage itself including the following steps:
the dual mode mobile station transmits a contact burst, made up of a pure sine wave at said uplink startup frequency;
the private base station, which is in receive mode over said uplink start-up frequency, receives the contact burst, and then answers by transmitting an acknowledgment burst, made up of a pure sine wave at a downlink start-up frequency associated with said uplink start-up frequency; and
the dual mode mobile station receive the acknowledgment burst.

Therefore, the general principle of the invention consists of pairing a dual mode mobile station with a private base station by making them operate a signal interchange protocol based on the same frequency hopping law, and with the same uplink start-up frequency, so that, depending on the previously transmitted or received frequency, each of the two stations (private base station or dual mode mobile station) knows whether it is to transmit or receive, and over which frequency.

Thus, because of frequency hopping, any risks of interference with other base stations (home or cellular) during the registration stage are minimized.

Besides, since the main protocol elements (i.e. frequency hopping law and uplink start-up frequency) are specific to the pair (private base station/dual mode mobile station), the duration of the registration stage can be very short.

Furthermore, it is important to note that, in the invention, it is always the dual mode mobile station that initiates the interchange of signals. Therefore, in standby mode, the private base station does not transmit any signal (it monitors the uplink start-up frequency), which prevents any interference with other base stations (home or cellular).

Advantageously, the dual mode mobile station transmits the first signal at the uplink start-up frequency after the user has indicated a desire to register the dual mode mobile station with the private base station.

Thus, it is the user who decides when to register a dual mode mobile station with the private base station. As explained above, this prevents the private base station from having to transmit a beacon-type signal in order to make its presence known to the dual mode mobile station.

Advantageously, the private base station is independent from the cellular radio system, the dual mode mobile station being accessible:

in "cordless" mode, by means of a first number associated with the private base station within the public telephone network, and in "cellular" mode, by means of a second number, that is distinct from said first number and that is associated, in the cellular radio system, with a subscriber identification module inserted in the dual mode mobile station.

In other words, in this instance, no attempt is made to keep the same number for both the "cordless" and the "cellular" modes. It is important to note that, in the invention, operation in "cordless" mode occurs completely independently of the cellular system (whether it be for making contact (with synchronization) or for setting up a call).

Generally speaking (and particularly in the case of the GSM), the subscriber's cellular number is stored in a card (for example a smart card) containing data which is specific to the subscriber. This card, called subscriber's identification module (or SIM card) in GSM, is designed to be inserted in any mobile station, and therefore, in particular, in the dual mode mobile station. In contrast, the subscriber's public number is always associated with a specific telephone connection to which the private base station is connected.

Preferably, the frequencies transmitted by the dual mode mobile station and by the private base station in application of said preset frequency hopping law are frequencies that are also used in "cellular" mode by the dual mode mobile station and by base stations within the cellular system, each "uplink" frequency transmitted by the dual mode mobile station being associated with a "downlink" frequency transmitted by the private base station, in order to make up one of the bi-directional channels used by the dual mode mobile station and the private base station in application of said preset frequency hopping law.

In other words, the frequency hopping law serves to switch from one bi-directional channel to another, each channel including an uplink (from dual mode mobile station t o private base station) and a downlink (from private base station to dual mode mobile station). The conventional channel structure of cellular systems (especially of the GSM type) is thus used, thereby avoiding hardware modifications to the dual mode mobile station compared with conventional (cellular only) mobile stations.

Preferably, said preset frequency hopping law belongs to the group containing:

hopping laws conventionally used in cellular radio; pseudorandom hopping laws; and hopping laws minimizing the probability of interference between cellular system and cordless system.

In an advantageous method of implementation of the invention, at least two dual mode mobile stations are associated with said private base station, the private base station and all dual mode mobile stations use the same preset uplink start-up frequency, and each distinct pair (private base station/dual mode mobile station) uses a distinct, preset frequency hopping law.

In this way, all aforementioned advantages also apply to the case of a private base station associated with a plurality of dual mode mobile stations.

This method of implementation using a plurality of dual mode mobile stations (operating with the same private base station) corresponds in particular to a business installation, where several employees possess dual mode mobile stations allowing them to be connected to the company's private base station.

In preferred manner, when the aforesaid radio system is of the time-division multiple access type, with the interchanged signals being structured in successive frames, and with each frame containing a preset number of time slots, said frame structure is preserved, each dual mode mobile station being allocated a specific time slot rank in each frame.

In a particular implementation of the invention, the aforesaid method includes the following successive stages:

an initial contact stage, during which the private base station and the dual mode mobile station check that they can contact each other;

a time synchronization stage, during which the dual mode mobile station is synchronized in time with the private base station;

a standby stage, during which:

the private base station and the dual mode mobile station ensure that their mutual time synchronization is maintained;

during an outgoing call, the dual mode mobile station transmits to the private base station, an access signal for the purpose of setting up a call;

during an incoming call, the private base station transmits to the dual mode mobile station, a paging message for the purpose of setting up a call.

It should be noted that, with this particular implementation method, the dual mode mobile station and the private base station synchronize themselves mutually, and do so completely independently of the cellular system.

BRIEF DESCRIPTION OF THE DRAWING

Other features and advantages of the invention appear in the following description of a preferred implementation of the invention, given as a non-limiting example, to be read in conjunction with the accompanying drawings, where:

FIG. 2 is a simplified flowchart of a specific implementation of the method of the invention.

DETAILED DESCRIPTION OF THE INVENTION

The invention thus relates to a registration method used for registering one or more dual mode mobile stations with an associated private base station.

Figure 1:
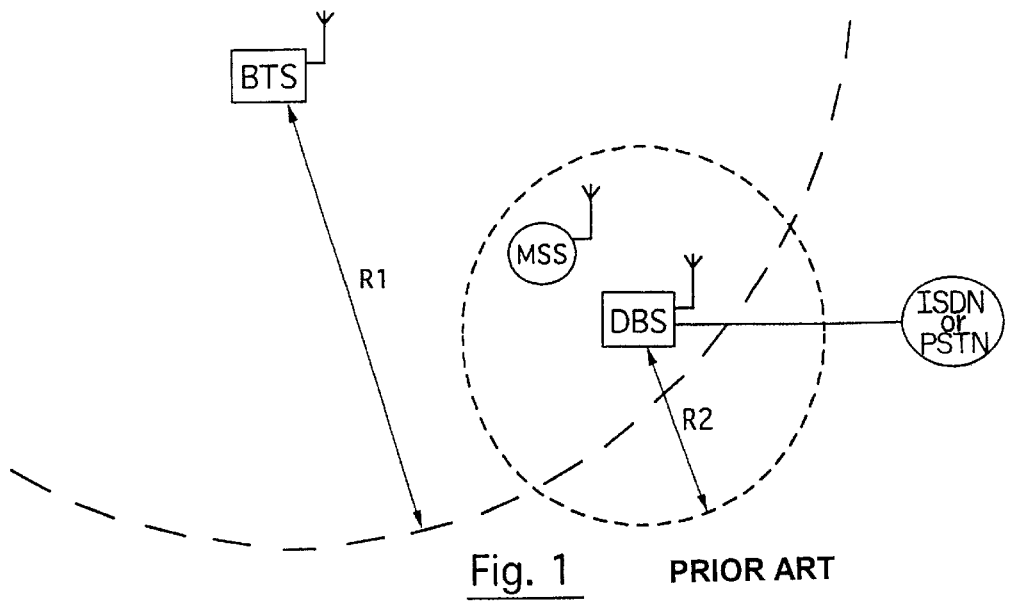
FIG. 1 is a schematic representation of a dual mode mobile station and its associated private base station, in which the registration method of the invention can be implemented.

Conventionally, as shown schematically in FIG. 1, a dual mode mobile station (MMS) can operate either in "cordless" mode, in which it communicates via its associated private base station (DBS), or in "cellular" mode, in which it communicates via one of the base stations (BTS) of a cellular radio system (for example a system of the GSM 900 or DCS 1800 type).

It is obvious that FIG. 1 is not to scale, the radius (R1) of the zone covered by a cellular base station (BTS) (i.e. the radius (R1) of a cell of the cellular system) being generally much greater than the radius (R2) of the zone covered by the private base station (DBS).

Within the context of the invention, the private base station (DBS) is connected only to the public telephone network (PSTN or ISDN for example). During transmission and reception, it uses frequencies that are identical to those used by the cellular radio system, in order to minimize hardware and software modifications to be made to the dual mode mobile station (MMS) compared with a conventional mobile station ("cellular" mode only).

When the dual mode mobile station (MMS) operates in "cordless" mode, there are two stages, that can be carried out successively as many times as necessary, i.e.:

a call set-up stage, carried out each time a new call is made, either by the dual mode mobile station (MMS) (outgoing call), or by the private base station (DBS) (incoming call):

a conversation stage, which follows implementation of the call set-up stage and enables voice or data to be interchanged between the dual mode mobile station (MMS) and other telephone equipment (not shown), via the private base station (DBS).

It should be noted that this other telephone equipment can be either another mobile station (single-mode or dual mode) also associated with the private base station (DBS), or any handset connected to the private base station (DBS) via the public telephone network.

The present invention relates to a preliminary stage carried out prior to operating in "cordless" mode (i.e. prior to the call set-up stages and successive conversation stages). More precisely, the present invention relates to the method enabling registration of the dual mode mobile station (MMS) with the private base station (DBS).

A particular aim of this registration method is firstly to inform the private base station (DBS) that the dual mode mobile station (MMS) is within its coverage, and secondly to synchronize the private base station (DBS) and the dual mode mobile station (MMS) relative to each other.

According to the invention, the registration method consists in interchanging signals in accordance with a preset protocol, based on two elements specific to and known by the private base station (DBS) and dual mode mobile station (MMS), i.e.:

a preset frequency hopping law, for determining the frequency over which each signal is to be transmitted, and a preset uplink start-up frequency, over which the dual mode mobile station (MMS) transmits the first signal.

The phrase "elements specific to the (MMS) and (DBS) stations" means that these elements are stored either physically by these stations (in one of their memories), or via respective cards (for example a SIM card) inserted in these stations. Of course, a combination of these two storage methods can be considered: the private base station physically storing these elements (hopping law and start-up frequency) while the dual mode mobile station stores them via the SIM card with which it cooperates.

It is important to note that the frequency hopping law and the uplink start-up frequency are specific to this pair (i.e. dual mode mobile station and private base station (MMS/DBS)). In other words, the two stations (MMS), (DBS) are paired and only can operate with each other.

For example, they are designed to be sold together, if the selection and storage of frequency hopping law and uplink start-up frequency are carried out in the factory.

However, in an alternative, it can be envisaged that the frequency hopping law and the uplink start-up frequency be stored in a SIM card, this card being duplicated and inserted in both stations (MMS) and (DBS).

In another alternative, it can be envisaged that the two stations (MMS), (DBS) are bought separately, with the selection and storage of the frequency hopping law and uplink start-up frequency being, in this case, carried out the first time they are used together (with for instance computation of the parameters in one of the two stations, followed by the transfer of the computed parameters via loading contacts).

The uplink start-up frequency and the following frequencies (determined in accordance with the frequency hopping law) can be frequencies that are also used by the dual mode mobile station (MMS) in "cellular" mode.

The preset frequency hopping law, specific to the pair (dual mode mobile station and private base station (MMS/DBS)), is for example a hopping law conventionally used in cellular radio. Nevertheless, it is obvious that many other hopping laws can be considered, such as pseudorandom hopping laws in particular, or again hopping laws especially designed to minimize the probability of interference between cellular systems and cordless systems. This involves in particular:

- interference between private base stations (DBS), and/or
- interference between private base stations (DBS) and cellular base stations (BTS), and/or
- interference between dual mode mobile stations and private base stations (DBS), and/or
- interference between dual mode mobile stations and cellular base stations.

The concept of the invention also applies where a plurality of dual mode mobile stations (MMS) are associated with the same private base station (DBS). In this case, the uplink start-up frequency is shared by all of the dual mode mobile stations (MMS), but each pair (dual mode mobile station and private base station (MMS/DBS)) uses its own frequency hopping law.

It is also important to note that it is always the dual mode mobile station (MMS) that transmits the first signal over the uplink start-up frequency. Hence, the private base station (DBS) can keep listening over this uplink start-up frequency, without transmitting any frequency; this prevents any interference with other private base stations (DBS) or with cellular base stations (BTS).

It can be envisaged that transmission by the dual mode mobile station (MMS) of the first signal be triggered by the user, for instance, by pressing a registration button fitted for this purpose on the dual mode mobile station (MMS). In this case, as soon as the user is in the zone covered by the private base station (DBS) (i.e. on getting home), the user triggers registration of the dual mode mobile station (MMS) with the private base station (DBS).

In an alternative, the dual mode mobile station (MMS) automatically triggers transmission of the first signal over the uplink start-up frequency and as a function of preset criteria (for example when cellular coverage is no longer effective, which may mean that the user has just gone indoors, perhaps at home: or else when the dual mode mobile station (MMS) is placed on a particular support).

As soon as the registration procedure has been completed, the dual mode mobile station (MMS) operates in "cordless" mode and receives or transmits calls via the private base station (DBS) and no longer via the cellular system, thus benefiting from public telephone network rates which are cheaper.

In a particular implementation, the private base station (DBS) is independent from the cellular radio system. Therefore, the subscriber's cellular number (which is stored in the SIM card inserted in the dual mode mobile station (MMS)) is different from the public number assigned to the private base station (DBS). In this instance, public number is to be understood as the number assigned to the private base station in the public switched network (PSTN) or the ISDN network. In "cellular" mode, the dual mode mobile station (MMS) receives calls (on the cellular number) via the cellular network. In "cordless" mode, the dual mode mobile station (MMS) is alerted via the private base station (if it has previously registered with this station) when the private base station (DBS) receives a call on the public number.

The present invention also applies in the case where the subscriber's cellular number is identical to the public number of the private base station (DBS). In this case however, some means of personalizing the private base station (DBS) needs to be provided (for example by placing the dual mode mobile station (MMS) in a particular support or by inserting a second SIM card in the private base station (DBS)). The present invention does not directly concern call routing techniques using the same number for the cordless system and the cellular system.

Figure 3:
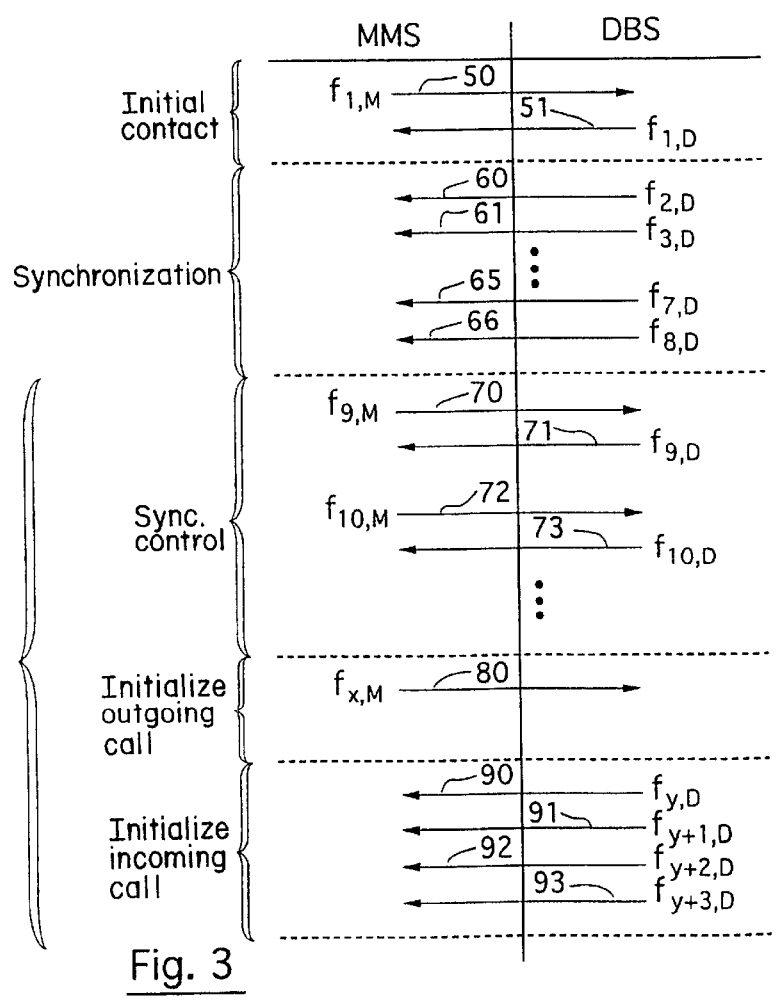
FIG. 3 is an example of an interchange of signals between the dual mode mobile station and the private base station when the method of the invention is implemented in accordance with the FIG. 2 flowchart.

With reference to FIGS. 2 and 3, there follows a description of a particular implementation of the registration method used for registering the dual mode mobile station (MMS) with the private base station (DBS), according to the invention.

In this example, it is assumed that the radio system is of the time-division multiple access type (TDMA), with the interchanged signals being structured in successive frames, and with each frame containing a preset number of time slots. This applies, for instance, to a GSM type system, in which each frame has 8 time slots.

This frame structure is preserved for the cordless system, i.e. for interchanging signals between the dual mode mobile station (MMS) and the private base station (DBS). Thus, each dual mode mobile station (MMS) is allocated a specific time slot rank in each frame. Consequently, if a frame has eight time slots (as is the case in GSM), a maximum of eight dual mode mobile stations (MMS) can be registered and operated with the same private base station (DBS).

As shown in the FIG. 2 flowchart, in a particular implementation, the method of the invention includes the following successive stages:

- an initial contact stage (20), during which the private base station (DBS) and the dual mode mobile station (MMS) ensure that they can contact each other;
- a time synchronization stage (30), during which the dual mode mobile station (MMS) is time synchronized with the private base station (DBS);
- a standby stage (40), during which:
- the private base station (DBS) and the dual mode mobile station (MMS) ensure that their mutual time synchronization is maintained;
- during an outgoing call, the dual mode mobile station (MMS) transmits an access signal to the private base station (DBS) for the purpose of setting up a call;

during an incoming call, the private base station (DBS) transmits a paging message to the dual mode mobile station (MMS), for the purpose of setting up a call.

Each of these stages is described below in greater detail with reference to FIG. 3 which shows an example of signal interchange between the dual mode mobile station and the private base station when the method of the invention is implemented in accordance with the FIG. 2 flowchart. In FIG. 3, each burst is represented by an arrow, and the frequency over which this burst is transmitted is specified.

The initial contact stage (20) includes the following steps:

step 21: the dual mode mobile station (MMS) transmits a contact burst (50), of duration roughly equal to that of one time slot, and made up of a pure sine wave at the uplink start-up frequency f1,M;

step 22: the private base station (DBS), which is in continuous receive mode over the uplink start-up frequency f1,M, receives the contact burst (50), and then answers by transmitting an acknowledgment burst (51), of duration roughly equal to that of one time slot, and made up of a pure sine wave at the downlink start-up frequency f1,D associated with the uplink start-up frequency f1,M;

step 23: the dual mode mobile station (MMS) receive the acknowledgment burst (51).

The time synchronization stage (30), carried out if the initial contact stage (20) occurred correctly, includes the following steps:

step 31: the private base station (DBS) transmits X synchronization bursts (60 to 66), at the rate of one burst per frame over X successive frames (in the example shown X=7). Each synchronization burst (60 to 66) is made up of a pure sine wave at a downlink frequency (f2,D to f8,D) selected in accordance with the frequency hopping law;

step 32: the dual mode mobile station (MMS) receives X synchronization bursts (60 to 66), enabling it to become time synchronized (double synchronization: frame and time slot) with the private base station (DBS).

The standby stage (40), carried out if the synchronization stage (30) takes place correctly, comprises the following steps:

step 41: the private base station (DBS) transmits:

every N frames, a synchronization control burst (71, 73) made up of a pure sine wave at a downlink frequency (f9,D, f10,D) selected in accordance with the frequency hopping law;

during an incoming call, a paging message comprising four bursts (90 to 93), transmitted at the rate of one burst per frame over four successive frames. Each of the paging message bursts (90 to 93) is structured for instance like a conventional GSM burst and is transmitted over a downlink frequency (fy,D to fy+3,D), selected in accordance with the frequency hopping law;

step 42: the dual mode mobile station (MMS) listens for a length of time slightly greater than the duration of the time slot it is allocated in each frame, and receives:

either a synchronization control burst (71, 73) transmitted by the private base station (DBS);

or one of the four bursts (90 to 93) of a paging message transmitted by the private base station (DBS);

or noise;

step 43: the dual mode mobile station (MMS) transmits:

every N frames, a synchronization control burst (70, 72) made up of a pure sine wave at an uplink frequency (f9,M, f10,M) selected in accordance with the frequency hopping law;

during an outgoing call, a request access channel (RACH) type burst (80) (call establishment request), structured for example like a conventional GSM burst and transmitted over an uplink frequency (fx,M) selected in accordance with the frequency hopping law;

step 44: the private base station (DBS) listens, for a length of time slightly greater than the duration of the time slot it is allocated in each frame, and receives:

either a synchronization control burst (70, 72) transmitted by the dual mode mobile station (MMS);

or a RACH type burst (80) transmitted by the dual mode mobile station (MMS);

or noise.

Following the initialization of a call (incoming or outgoing), the following stages can be identical to those implemented in the GSM, except for the fact that the successive bursts of any message are interchanged at frequencies which are determined by the preset frequency hopping law (used during of the registration procedure as proposed by the present invention).

In this example, during the standby stage (40), both the dual mode mobile station (MMS) and private base station (DBS) transmit every N frames, in order to maintain mutual synchronization. It can also be envisaged that both stations (MMS) and (DBS) transmit with a shift of N/2 frames.

In the case of operation with a plurality of dual mode mobile stations (MMS), if a dual mode mobile station is already registered, the private base station (DBS) operates with this dual mode mobile station over one of the time slots of each frame. However, the private base station (DBS) remains in receive mode (over the start-up frequency) for all the remaining time slots of each frame.

What is claimed is:

1. A registration method used for registering at least one dual mode mobile station (MMS) with an associated private base station (DBS), said private base station (DBS) being connected to a public telephone network (PSTN, ISDN) and using, for transmission and reception, frequencies which are close to or identical to those used in a cellular radio system, said dual mode mobile station (MMS) being able to operate either in "cordless" mode, or in "cellular" mode, said method comprising:

interchanging signals in accordance with a preset protocol based on a preset frequency hopping law, for determining a frequency over which each signal is to be transmitted, and on a preset uplink start-up frequency (f1,M), over which the dual mode mobile station transmits a first signal, said frequency hopping law and said uplink start-up frequency being specific to, and known by, the dual mode mobile station and associated private base station, said method further comprising an initial contact stage (20) itself including the following steps:

transmitting, at the dual mode mobile station, a contact burst (50), made up of a pure sine wave at said uplink start-up frequency (f1,M);

receiving, at the private base station which is in receive mode, the contact burst (50), and answering by transmitting an acknowledgment burst (51), made up of a pure sine wave at a downlink start-up frequency (f1,D) associated with said uplink start-up frequency (f1,M); and receiving, at the dual mode mobile station, the acknowledgment burst (51).

2. The method according to clam 1, wherein the dual mode mobile station (MMS) transmits the first signal at the uplink start-up frequency (f1,M) after a user has indicated a desire to register the dual mode mobile station (MMS) with the private base station (DBS).

3. A method according of claim 1, characterized in that, the private base station (DBS) is independent from the cellular radio system, the dual mode mobile station (MMS) being accessible:

in "cordless" mode, by means of a first number associated with the private base station within the public telephone network, and in "cellular" mode, by means of a second number, that is distinct from said first number and that is associated, in the cellular radio system, with a subscriber identification module inserted in the dual mode mobile station.

4. The method according to claim 1, wherein the frequencies transmitted by the dual mode mobile station (MMS) and by the private base station (DBS) in application of said preset frequency hopping law are frequencies that are also used in "cellular" mode by the dual mode mobile station and by base stations within the cellular system, and wherein each "uplink" frequency transmitted by the dual mode mobile station (MMS) is associated with a "downlink" frequency transmitted by the private base station (DBS), in order to make up one of the bi-directional channels used by the dual mode mobile station and the private base station in application of said preset frequency hopping law.

5. A method according to claim 1, characterized in that, said preset frequency hopping law belongs to the group containing:

hopping laws conventionally used in cellular radio;

pseudorandom hopping laws; and hopping laws minimizing the probability of interference between cellular system and cordless system.

6. The method according to claim 1, wherein at least two dual mode mobile stations (MMS) are associated with said private base station (DBS), said private base station and all dual mode mobile stations using the same preset uplink start-up frequency, and wherein each distinct pair (private base station and dual mode mobile station) uses a distinct, preset frequency hopping law.

7. A method according to claim 1, said radio system being of the time-division multiple access type (TDMA), with the interchanged signals being structured in successive frames, and with each frame containing a preset number of time slots, this method is characterized in that said frame structure is preserved, each dual mode mobile station being allocated a specific time slot rank in each frame.

8. A method according to claim 1, characterized in that, it includes the following successive stages:

an initial contact stage (20), during which the private base station (DBS) and the dual mode mobile station (MMS) ensure that they can contact each other;

a time synchronization stage (30), during which the dual mode mobile station (MMS) is time synchronized with the private base station (DBS);

a standby stage (40), during which:

the private base station (DBS) and the dual mode mobile station (MMS) ensure that their mutual time synchronization is maintained;

during an outgoing call, the dual mode mobile station (MMS) transmits an access signal to the private base station (DBS) for the purpose of setting up a call;

during an incoming call, the private base station (DBS) transmits a paging message to the dual mode mobile station (MMS), for the purpose of setting up a call.

9. The method according to claim 1, wherein the private base station stores said preset frequency hopping law and said preset uplink start-up frequency in a memory.

10. The method according to claim 1, wherein the private base station stores said preset frequency hopping law and said preset uplink start-up frequency in a card.

* * * * *